Figure 1:
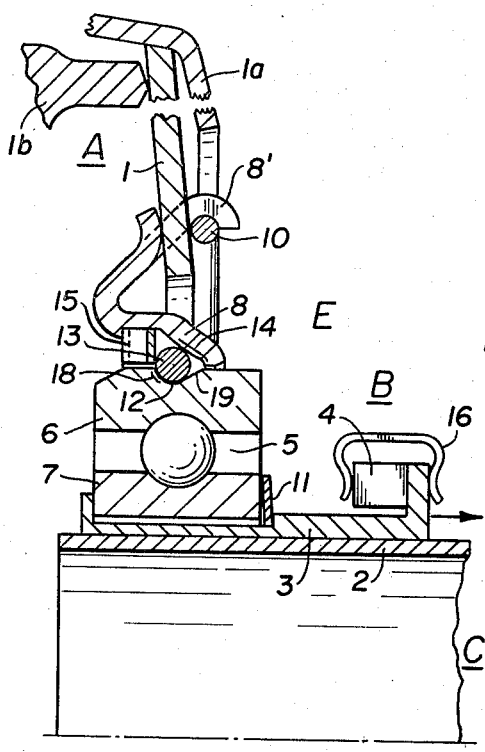

United States Patent [19]

Huber et al.

[11] 4,228,882
[45] Oct. 21, 1980

[54] FRICTION CLUTCH UNIT

[75] Inventors: Lothar Huber, Bühl-Altschweier; Werner Reitz, Ottersweier, both of Fed. Rep. of Germany

[73] Assignee: Luk Lamellen und Kupplungsbau GmbH, Bühl, Fed. Rep. of Germany

[21] Appl. No.: 831,109

[22] Filed: Sep. 7, 1977

[30] Foreign Application Priority Data

Sep. 3, 1976 [DE] Fed. Rep. of Germany ....... 2639766

[51] Int. Cl.² ............................................ F16D 23/14
[52] U.S. Cl. .................................. 192/98; 192/89 B; 192/110 B
[58] Field of Search .................. 192/98, 110 B, 89 B; 285/DIG. 22

[56] References Cited

U.S. PATENT DOCUMENTS

| 3,252,721 | 5/1966 | Weasler | 74/527 X |
| 3,973,659 | 8/1976 | Ernst et al. | 192/98 X |

FOREIGN PATENT DOCUMENTS 2236113  1/1975  France ..................................... 192/98

*Primary Examiner*—Allan D. Herrmann
*Attorney, Agent, or Firm*—Herbert L. Lerner

[57] ABSTRACT

Friction clutch for connecting a motor and transmission by rotationally locking and disconnecting them through a disengaging system acting upon parts of a clutch and against spring-biasing forces, the disengaging system including a guide slidable along a path located at the transmission side of the clutch, disengaging means acting upon the guide for sliding it along the path, antifriction bearing means having a bearing race connectible with the clutch at the motor side and a bearing race connected to the guide at the transmission side, a connection between the first race and parts of the clutch, at least part of the disengaging system being preassemblable, as a first sub-assembly, on the path at the transmission side, the clutch being preassemblable as a second sub-assembly at the motor side, and a locking device including matching lockable components on the sub-assemblies, and a connection between the sub-assemblies, one of the matching components of the locking device including an annular detent formed in one of the sub-assemblies and the other component of the locking device including at least one annular member supportable by a conical section of the other of the sub-assemblies and being axially spring-loadable to project radially from the conical section toward the detent, the member being annular and initially displaceable axially and radially along the conical section until it snaps into the detent to connect the motor and transmission.

9 Claims, 4 Drawing Figures

FRICTION CLUTCH UNIT

The invention relates to a friction clutch unit or assembly for selectively connecting a motor and a transmission by rotationally locking them to one another and disconnecting them from one another through a disengaging system acting upon parts of a clutch and against spring-biasing forces, the disengaging system including a guide member, such as a guide-sleeve slidable along a guidance path located at the transmission side of the clutch assembly, disengaging means, such as a disengaging fork, acting upon the guide member for sliding the same along the guidance path, antifriction bearing means having a bearing race connectible with the clutch of the motor side and a bearing race connected to the guide member at the transmission side, means for effecting the connection between the first-mentioned bearing race and parts of the clutch, at least part of the disengaging system being preassemblable, as a first sub-assembly, on the guidance path at the transmission side, the clutch being preassemblable as a second sub-assembly at the motor side, and a locking device including respective matching components lockable one with the other and carried by the first and second sub-assemblies, respectively, and means for effecting, during connection of the motor and the transmission, and at least in direction of disengagement, a force-locking connection between the preassembled first and second sub-assemblies.

It is an object of the invention to provide a friction clutch unit or assembly of the foregoing general type which affords an improved operation thereover.

With the foregoing and other objects in view, there is provided, in accordance with the invention, a friction clutch assembly for selectively connecting a motor and a transmission by rotationally locking them to one another and disconnecting them from one another through a disengaging system acting upon parts of a clutch and against spring-biasing forces, the disengaging system including a guide member slidable along a guidance path located at the transmission side of the clutch assembly, disengaging means acting upon the guide member for sliding the same along the guidance path, antifriction bearing means having a bearing race connectible with the clutch of the motor side and a bearing race connected to the guide member at the transmission side, means for effecting the connection between the first-mentioned bearing race and parts of the clutch, at least part of the disengaging system being preassemblable as a first sub-assembly, on the guidance path at the transmission side, the clutch being preassemblable as a second sub-assembly at the motor side, and a locking device including respective matching components lockable one with the other and carried by the first and second sub-assemblies, respectively, and means for effecting, during connection of the motor and the transmission, and at least in direction of disengagement, a force-locking connection between the preassembled first and second sub-assemblies, one of the matching components of the locking device comprising an annular detent formed in one of the first and second preassembled sub-assemblies and the other of the matching components of the locking device comprising at least one member having an annular configuration supportable by a conical section of the other of the first and second preassembled sub-assemblies and being spring-loadable in axial direction so as to project from the conical section toward the annular detent in radial direction, the member having the annular configuration being initially displaceable in radial as well as axial direction along the conical section until it is snappable into the annular detent so as to connect the motor and the transmission.

Although the member having an annular configuration may, in fact, be formed of several individual parts, in accordance with specific features of the invention, the member having an annular configuration is a ring yieldable in radial direction, such as a split ring.

In accordance with another feature of the invention, the clutch has disengaging means, and the annular detent is a groove formed in the bearing race connectible with the clutch, the conical section carrying the annularly configured member being located at a connecting member secured to the disengaging means of the clutch and including spring means braced against the connecting member and biasing the annularly configured member in a manner that the annularly configured member, at least in released condition of the locking connection is located in a region of minimal diameter of the conical section and projects radially inwardly beyond this region of minimal diameter.

In accordance with a further feature of the invention, the anti-friction bearing race which is rotatable with the clutch and carries the detent for the member having an annular configuration carries an intercepting device in the form of an inwardly running bevel, a chamfer, a cone or the like, which can serve to facilitate the introduction of the disengaging system as well as for expanding the member having an annular configuration while the two sub-assemblies are slid together.

In accordance with an added feature of the invention, the clutch has disengaging means, and the annular detent is a groove formed in a connecting member secured to the disengaging means of the clutch, the conical section being formed on the race of the antifriction bearing connectible with the clutch, and including spring means braced against the bearing race connectible with the clutch and biasing the annularly configured member in a manner that the annularly configured member, at least in released condition of the locking connection, is located in a region of maximal diameter of the conical section and projects radially outwardly beyond this region of maximal diameter.

In accordance with an additional feature of the invention, the one of the first and second sub-assemblies wherein the annular detent is formed carries intercepting means for facilitating introduction of the disengaging system containing subassembled parts of the locking device.

In accordance with yet another feature of the invention, the one of the first and second sub-assemblies wherein the annular detent is formed carries intercepting means for varying the diameter of the member having an annular configuration during assembly together of the first and second sub-assemblies.

In accordance with yet a further feature of the invention, the intercepting means is a structure selected from the group consisting of a chamfer, a bevel or a cone.

In accordance with a concomitant feature of the invention, a portion of the annular detent has a given steep profile engageable by the member having an annular configuration for effecting disengagement of the clutch, and the annular detent has another profile portion opposite the first-mentioned portion which is flatter than the given steep profile. Such a construction facilitates the loosening or releasing of the locking connection in the disassembled condition of the clutch i.e. the disassembly of the disengaging bearing from the clutch is afforded in an especially simplified manner by exerting pressure against the disengaging direction, whereby the annular or ring member snaps out of the detent. Other features which are considered as characteristic for the invention are set forth in the appended claims.

Although the invention is illustrated and described herein as embodied in a friction clutch unit, it is nevertheless not intended to be limited to the details shown, since various modifications and structural changes may be made therein without departing from the spirit of the invention and within the scope and range of equivalents of the claims.

Figure 2:
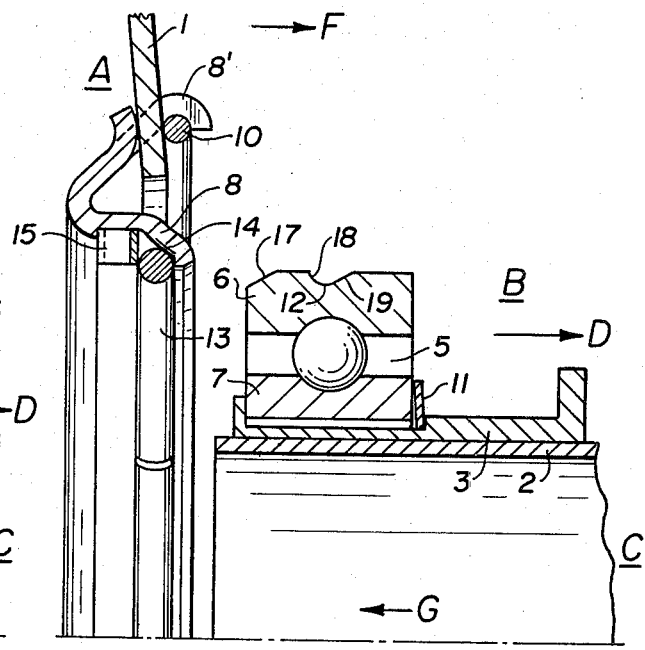
Figure 3:
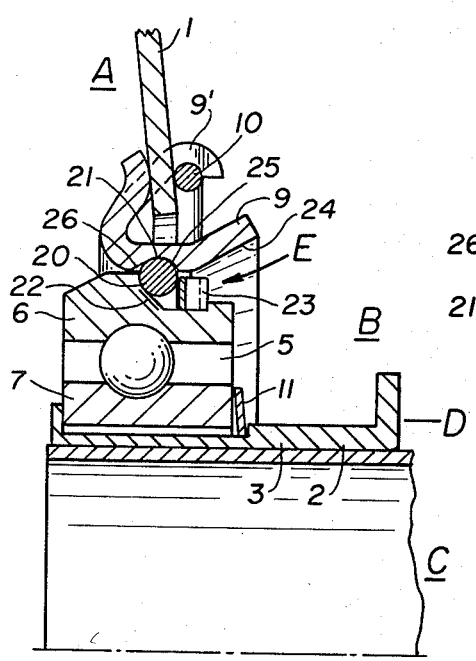
Figure 4:
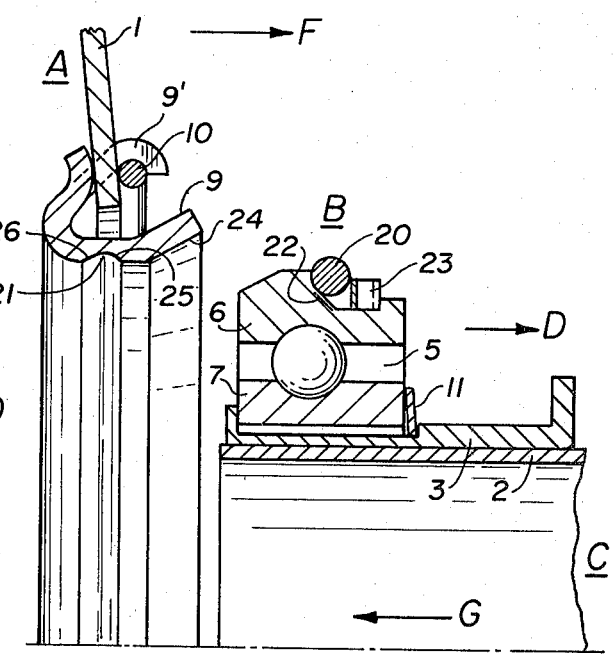

The construction and method of operation of the invention, however, together with additional objects and advantages thereof will be best understood from the following description of specific embodiments when read in connection with the accompanying drawings, in which:

FIGS. 1 and 2 are half sectional views of an embodiment of the friction clutch unit of the invention, respectively in assembled condition (FIG. 1) and in the preassembled condition (FIG. 2); and FIGS. 3 and 4 are views similar to those of FIGS. 1 and 2, respectively, of another embodiment of the invention, likewise in assembled condition (FIG. 3) and in preassembled condition (FIG. 4).

Those structural elements common to both embodiments are first described hereinafter.

Referring now to the figures of the drawing, there is shown therein a clutch which is provided on the motor side A, with disengaging means therefor in the form of diagrammatically and fragmentarily illustrated tabs or tongues of a cup or plate spring 1 radially outwardly engaging a cover 1a and radially inwardly therefrom resiliently biasing a pressure plate 1b. The clutch has a disengaging system B made up of a guide member in the form of a sliding sleeve 3 which is slidable along a guideance path in the form of a guide tube 2 which is provided on the transmission side C of the clutch and which can be acted upon in the disengagement direction D by disengagement means, namely a diagrammatically illustrated disengaging fork 4; the disengaging system B, furthermore, includes an antifriction or roller bearing 5 having a bearing ring or race 6 intended for rotation with the clutch of the motor side A, and a bearing ring or race 7 connected to the sliding sleeve 3, and connecting means 8 (FIGS. 1 and 2 and 9 (FIGS. 3 and 4) effective between the bearing ring or race 6 and the plate spring tabs or tongues 1.

The connecting means 8 are dish-shaped pressure members which are held fast against i.e. secured to the plate or cup spring tabs or tongues 1 by means of individual outwardly bent tabs 8' or 9', respectively, and a ring 10.

A locking connection E is effective between the parts 6 and 8, on the one hand, as well as 6 and 9, on the other hand.

In the embodiment of FIGS. 1 and 2, the locking connection E is made up of a detent 12 in the form of an annular groove, which is provided in the bearing ring or race 6, and an open or split ring member 13, for example, formed of spring steel wire, which is yieldable in radial direction and is disposed within a conical section 14 of the pressure member or connecting means 8, and is loaded or biased by a corrugated spring 15 which acts in axial direction, whereby it is urged in direction toward the smaller diameter end of the conical section 14 and, at least when the locking connection E is loosened or released, projects radially inwardly beyond the radially inner diameter of the region 14.

The bearing 5 is clamped against relative axial displacement on the sliding sleeve 3 through the bearing ring or race 7 by a cup or plate spring 11, and has a slight amount of play relative to the sliding sleeve 3 in radial direction.

Before assembly of the motor and transmission units, the sliding sleeve 3 together with the bearing 5 is preassembled on the guide tube 2 secured to the transmission side C. The bearing race 6 and, accordingly, the detent 12 forming part of the locking connection E is thus located on the assembly unit preassembled on the transmission side C. In addition, the disengaging fork 4 is preassemblable on the otherwise non-illustrated bearing or support therefor, and is connectible to the sliding sleeve 3 by means of a clamping spring or clip 16.

On the motor side A, the clutch is preassembled with the pressure element 8 and the other part of the locking connection E, namely the annular member or ring 13.

When assembling the motor and transmission units by relative movement thereof in the direction of the arrows F and G, an intercepting device 17 in the form of a conical section initially facilitates centering and introduction of the aforedescribed two preassembled subassemblies and, moreover, expands or widens the ring member 13 in radial direction and against the biasing force of the spring 15. The annular member 13 is thereby simultaneously displaced in axial direction onto a region of the conical section having a greater diameter than that of the region thereof at which it was initially located. When the preassembled units are slid into one another in direction of the arrows F and G far enough so that the annular member 13 can snap into the annular groove 12 due to the force of the spring 15, the locked position shown in FIG. 1 is attained.

The region 18 of the detent 12, effective during disengaging operation in the direction D, matches the profile of the annular member 13, while the region 19 opposite the region 18 has a flatter shape. The disengagement bearing 5 together with the sliding sleeve 3 can thereby be disassembled from the clutch, in the disassembled condition of the clutch, by the application of pressure in the direction opposite to the disengaging direction D, the annular member 13 remaining within the pressure element 8.

In the embodiment of FIGS. 3 and 4, the locking connection E is also formed of an open or split annular member or ring 20 yieldable in radial direction, on the one hand, and a groove-like detent 21, on the other hand, but the latter is incised into the pressure member 9 which is connected to the cup or plate spring tabs or tongues 1, and the annular member 20 is disposed at a conical section 22 of the bearing ring or race 6 intended for rotation with the clutch at the motor side A. The annular member 20 is biased by a corrugated spring 23 in direction toward a larger diameter portion of the conical section 22 than that at which it was initially disposed, and, at least when the locking connection E is loosened or released, projects beyond the outer diameter of this bearing ring or race 6 in direction toward the detent 21.

According to FIG. 4, the clutch preassembled on the motor side A thus contains, namely through the pressure number 9, one part i.e. the detent 21 of the locking connection E, while the other parts of the locking connection E are preassembled on the transmission side C.

Advantageously, an intercepting device 24 in the form of a conical section is provided at the pressure dish 9, through which on the one hand, the introduction and, initially, the centering during the assembly of the preassembled units in direction of the arrows F and G are facilitated, and through which also the annular member 20 is radially compressed, whereby the latter is also displaced in axial direction along the conical section 22 until the preassembled units arrive at an axial position relative to one another wherein the annular member or ring 20, which is loaded or biased axially by the spring 23 and is therefore expanded in radial direction due to conical section 22, is caused to snap into the detent 21 and thereby complete the locking connection E as shown in FIG. 3. Just as in FIGS. 1 and 2, in the embodiment of FIGS. 3 and 4, the profile or contour 25 of the detent 21, which is acted upon during disengagement in direction of the arrow D, is formed steeper than the profile 26 of the detent 21 located on the other side of the annular member 20 for the purpose of facilitating disassembly.

There are claimed:

1. In a friction clutch assembly for selectively connecting a motor and a transmission by rotationally locking them to one another and disconnecting them from one another through a disengaging system acting upon parts of a clutch and against spring-biasing forces, the disengaging system including a guide member slidable along a guidance path located at the transmission side of the clutch assembly, disengaging means acting upon the guide member for sliding the same along the guidance path, antifriction bearing means having a bearing race connectible with the clutch at the motor side and a bearing race connected to the guide member at the transmission side, means for effecting the connection between the first-mentioned bearing race and parts of the clutch, at least part of the disengaging system being preassemblable, as a first sub-assembly, on the guidance path at the transmission side, the clutch being preassemblable as a second sub-assembly at the motor side, and a locking device including respective matching components lockable one with the other and carried by the first and second sub-assemblies, respectively, and means for effecting, during connection of the motor and the transmission, and at least in direction of disengagement, a force-locking connection between the preassembled first and second sub-assemblies, one of the matching components of the locking device comprising an annular detent formed in one of said first and second preassembled subassemblies and the other of the matching components of the locking device comprising at least one member having an annular configuration supportable by a conical section of the other of said first and second preassembled sub-assemblies and being spring-loadable in axial direction so as to project from the conical section toward said annular detent in radial direction, said member having said annular configuration being initially displaceable in radial as well as axial direction along said conical section until it is snappable into said annular detent so as to connect the bearing means to the clutch.

2. Friction clutch assembly according to claim 1 wherein the clutch has disengaging means, and wherein said annular detent is a groove formed in the bearing race connectible with the clutch, said conical section carrying said annularly configured member being located at a connecting member secured to said disengaging means of the clutch and including spring means braced against connecting member and biasing said annularly configured member in a manner that said annularly configured member, at least in released condition of the locking connection, is located in a region of minimal diameter of said conical section and projects radially inwardly beyond this region of minimal diameter.

3. Friction clutch assembly according to claim 1 wherein the clutch has disengaging means, and wherein said annular detent is a groove formed in a connecting member secured to said disengaging means of the clutch, said conical section being formed on the race of the antifriction bearing connectible with the clutch, and including spring means braced against said bearing race connectible with the clutch and biasing said annularly configured member in a manner that said annularly configured member, at least in released condition of the locking connection, is located in a region of maximal diameter of said conical section and projects radially outwardly beyond this region of maximal diameter.

4. Friction clutch assembly according to claim 1 wherein said member having an annular configuration is a ring yieldable in radial direction.

5. Friction clutch assembly according to claim 4 wherein said ring is a split ring.

6. Friction clutch assembly according to claim 1 wherein said one of said first and second sub-assemblies wherein said annular detent is formed to carry intercepting means for facilitating introduction of said disengaging system containing subassembled parts of said locking device.

7. Friction clutch assembly according to claim 1 wherein said one of said first and second sub-assemblies wherein said annular detent is formed to carry intercepting means for varying the diameter of said member having an annular configuration during assembly together of said first and second sub-assemblies.

8. Friction clutch assembly according to claim 7 wherein said intercepting means is a structure selected from the group consisting of a chamfer, a bevel or a cone.

9. Friction clutch assembly according to claim 1 wherein a portion of said annular detent has a given steep profile engageable by said member having an annular configuration for effecting disengagement of the clutch, and said annular detent has another profile portion opposite said first-mentioned portion which is flatter than said given steep profile.

* * * * *